United States Patent [19]
Miller et al.

[11] Patent Number: 5,948,030
[45] Date of Patent: Sep. 7, 1999

[54] STEERING ANGLE DETERMAINATION METHOD AND APPARATUS

[75] Inventors: Randy Scott Miller, Frankenmuth; Paul Ashby Murphy, Saginaw, both of Mich.

[73] Assignee: General Motors Corporation, Detroit, Mich.

[21] Appl. No.: 08/900,671

[22] Filed: Jul. 25, 1997

[51] Int. Cl.[6] .................................. B62D 5/00; B62D 6/00
[52] U.S. Cl. .............................. 701/41; 180/443; 702/104
[58] Field of Search ............................... 701/41; 180/443; 702/104, 105, 87, 151

[56] References Cited

U.S. PATENT DOCUMENTS

| | | | |
|---|---|---|---|
| 4,887,682 | 12/1989 | Drutchas et al. | 180/446 |
| 5,032,996 | 7/1991 | Shiraishi | 364/424.051 |
| 5,343,393 | 8/1994 | Hirano et al. | 364/424.051 |
| 5,422,810 | 6/1995 | Brunning et al. | 364/424.05 |
| 5,465,210 | 11/1995 | Walenty | 364/424.05 |
| 5,732,372 | 3/1998 | Marsden | 701/41 |
| 5,857,160 | 1/1999 | Dickinson et al. | 701/41 |

FOREIGN PATENT DOCUMENTS

| | | |
|---|---|---|
| 440 365 A2 | 1/1991 | European Pat. Off. . |
| 2 257 551 | 1/1993 | United Kingdom . |
| 2269571 | 2/1994 | United Kingdom . |

*Primary Examiner*—Michael J. Zanelli
*Attorney, Agent, or Firm*—Edmund P. Anderson

[57] ABSTRACT

In a vehicle with a hand wheel, steerable wheels positionally responsive to the hand wheel and a steering position sensor coupled to the handwheel and providing a handwheel angle signal indicative of an angular position of the handwheel, a steering angle determination method comprising the steps of: first filtering the handwheel angle signal to provide a first filter output; defining a comparison window around the first filter output; comparing the handwheel angle signal to the comparison window; when the handwheel angle signal is within the comparison window, second filtering the handwheel angle signal to provide a second filter output; when the handwheel angle signal is not within the comparison window, maintaining the second filter output fixed; and determining a steer angle signal as the difference between the handwheel angle signal and the second filter output, wherein offsets between the handwheel angle signal and steered positions of the steerable wheels are compensated for.

5 Claims, 3 Drawing Sheets

5,948,030

STEERING ANGLE DETERMAINATION METHOD AND APPARATUS

This invention relates to a steering angle determination method and apparatus.

BACKGROUND OF THE INVENTION

Certain steering or chassis control systems for motor vehicles utilize information such as steering wheel angular position as measured by a steering wheel position sensor. In general, the steering wheel position sensor provides an output signal that increases as the steering wheel (also referred to as the hand wheel) is steered in one direction and decreases when the steering wheel is steered in the other direction. The output signal may be an analog signal or it may be a digital signal that increments and decrements a digital counter with movement of the steering wheel. Some sensors provide an on-center position signal meant to correspond to when the vehicle is steered straight ahead. However, offsets between the angular position of the steering wheel as measured by the steering wheel sensor and the steered position of the front wheels of the vehicle may occur due to drift in electrical components of the sensor and mechanical misalignment in assembling the sensor to the vehicle or that occur as the vehicle ages. Thus, the on-center signal of the position sensor may be offset from the true on-center steering position of the vehicle.

In view of this nature of the steering position sensor, some sensors are provided without an inherent on-center position signal and, thus, the steering position signal output simply indicates relative angular movement of the steering wheel.

SUMMARY OF THE INVENTION

It is an object of this invention to provide a steering angle determination method in accordance with claim 1.

Advantageously, this invention provides a steering angle determination method that detects the existence of and quantity of offset between the steering angle position sensor output signal and to the steered position of the vehicle's front wheels (the steered wheels) and uses the offset to determine an accurate steered position of the steered wheels.

Advantageously, this invention utilizes a method and apparatus that recognizes certain vehicle operating conditions which, when met, indicate that the average steering direction of the vehicle is essentially straight ahead. During these conditions then, the average value of the position sensor output signal is taken as an effective measure of the steering position sensor offset.

Advantageously then, according to a preferred example, this invention provides a steering angle determination method for use in a vehicle with a hand wheel, steerable wheels positionally responsive to the hand wheel and a steering position sensor coupled to the hand wheel and providing a hand wheel angle signal indicative of an angular position of the hand wheel, wherein the method comprises the steps of: first filtering the hand wheel angle signal to provide a first filter output; defining a comparison window around the first filter output; comparing the hand wheel angle signal to the comparison window; when the hand wheel angle signal is within the comparison window, second filtering the hand wheel angle signal to provide a second filter output; when the hand wheel angle signal is not within the comparison window, maintaining the second filter output substantially fixed; and determining a steer angle signal as the hand wheel angle signal minus the second filter output, wherein offsets between the hand wheel angle signal and steered positions of the steerable wheels are compensated for.

In a preferred example, the first and second filtering are only done when the measured vehicle speed is above a threshold value.

According to another example, this invention provides a steering angle determination apparatus for use in a vehicle with a hand wheel, steerable wheels positionally responsive to the hand wheel and a steering position sensor coupled to the hand wheel and providing a hand wheel angle signal indicative of an angular position of the hand wheel, wherein the apparatus comprises: a first filter having a first input and a first output wherein the first input receives the hand wheel angle signal from the steering position sensor and the first output provides a first filtered signal; a window comparator having a center input, a data input and a comparison output, wherein the first filtered signal is coupled to the center input and the hand wheel angle signal is coupled to the data input wherein the window comparator defines a window around the first filtered signal at the center input and provides a positive comparison signal at the comparison output when the hand wheel angle signal at the data input is within the comparison window; a second filter having a second input and a second output wherein the second input receives the hand wheel angle signal and the second output provides a second filtered signal that (a) is updated in response to the hand wheel angle signal when the comparison output provides a positive comparison signal and (b) is maintained fixed when the comparison output does not provide the positive comparison signal, wherein the second filtered signal represents an offset between the hand wheel angle signal and a steering position of the steerable wheels.

BRIEF DESCRIPTION OF THE DRAWINGS

The present invention will now be described by way of example with reference to the following drawings in which.

DESCRIPTION OF THE PREFERRED EMBODIMENT

Figure 1:
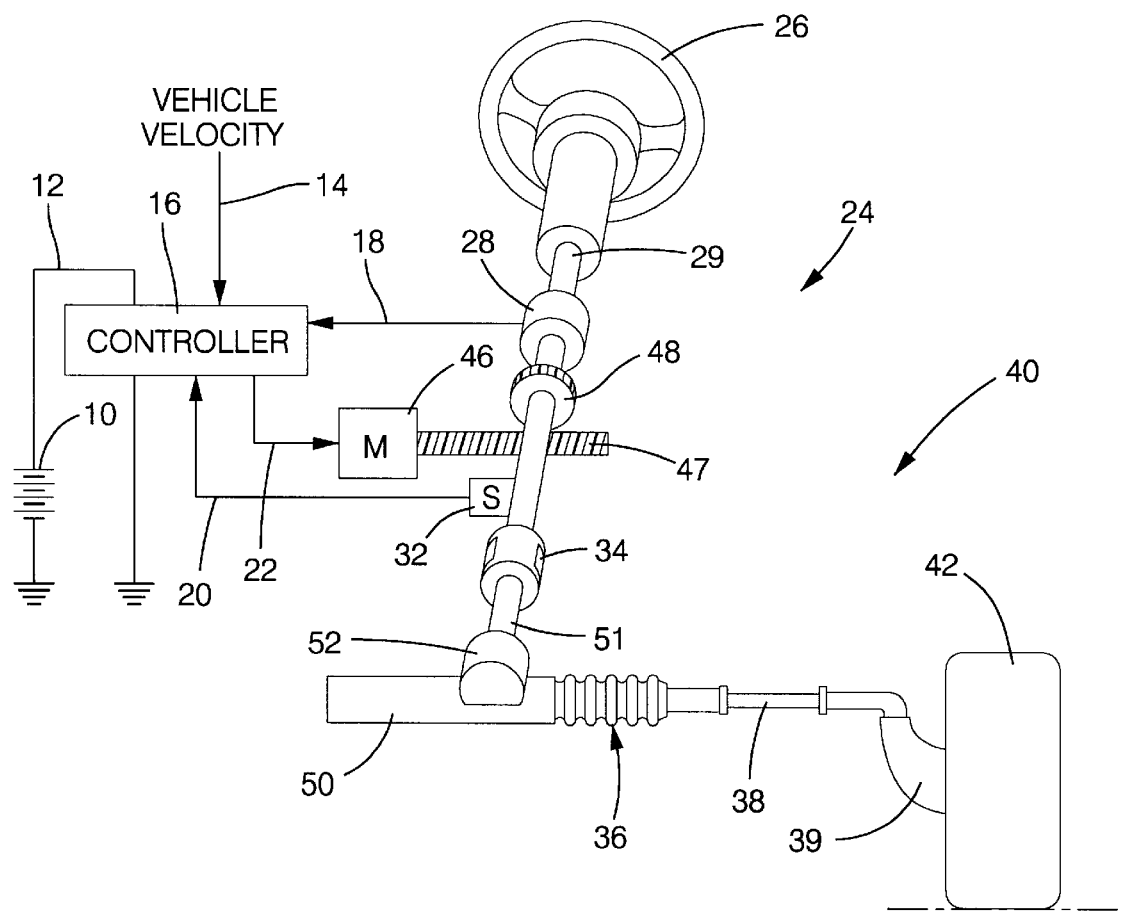
FIG. 1 illustrates schematically the apparatus according to this invention.

Referring now to FIG. 1, reference numeral 40 generally designates a motor vehicle power steering system suitable for implementation of this invention. It will be understood by those skilled in the art that this invention is not limited to use in power steering systems but may be used with any vehicle system such as a chassis control system for controlling wheel brakes, controllable suspension dampers or any other actuator in response to an input representing angular position of the vehicle steering wheel.

The steering mechanism 36 is a rack and pinion type system that includes a toothed rack (not shown) and a pinion gear (also not shown) located under gear housing 52. As the steering wheel 26 is turned, the steering shaft 29 turns and the lower steering shaft 51 connected to the upper steering shaft 29 through universal joint 34 turns the pinion gear. Rotation of the pinion gear moves the rack which moves tie rods 38 (only one shown), in turn moving the steering knuckles 39 (only one shown) that turn wheels 42 (only one shown).

In the example system, electric power assist is provided through the unit generally designated by reference numeral 24 and includes controller 16 and the electric motor 46. The controller 16 is powered by the vehicle power supply 10 through line 12 and receives a signal representative of vehicle velocity on line 14. Steering pinion gear angle is measured through position sensor 32, which may be an optical encoding type sensor, variable resistance type sensor or any other suitable type of position sensor. Line 20 provides the measured steering pinion gear angle to the controller 16.

As the steering wheel 26 is turned, torque sensor 28 senses the torque applied to the steering wheel 26 by the vehicle operator. The torque sensor 28 may include a torsion bar (not shown) and a variable resistance type sensor (also not shown), which outputs a variable resistance signal to controller 16 through line 18 in relation to the amount of twist on the torsion bar. Although this is the preferred torque sensor, any other suitable torque sensing device used with known signal processing techniques will suffice.

In response to the inputs on lines 14, 18 and 20, controller 16 sends a current command to the electric motor 46, which supplies torque assist to the steering system through worm 47 and worm gear 48. Except as described herein, the control algorithm for use by the controller 16 may be any suitable type of known or future developed control algorithm for generating the appropriate commands for the electric motor 46 to provide a desired steering torque assist.

Figure 2:
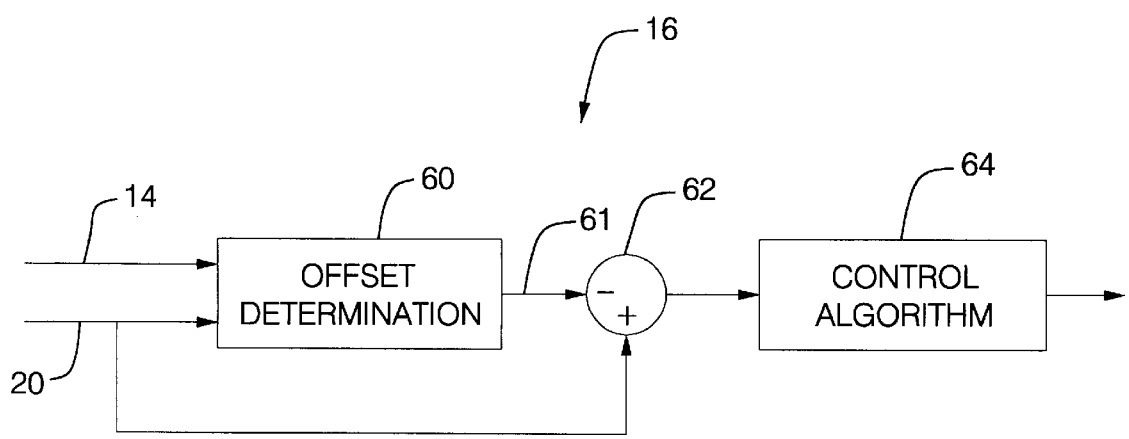
FIG. 2 illustrates schematically high level control incorporating this invention.

Referring now to FIG. 2, the schematic shown illustrates an example high level control according to this invention. The offset determination block 60 responds to the vehicle speed and steering wheel position signals on lines 14 and 20. Block 60 provides a signal on line 61 indicative of the offset in the steering wheel position signal on line 20 with respect to the true steering position of the vehicle steered wheels 42 (FIG. 1). Summation block 62 subtracts the steering offset on line 61 from the steering wheel position signal on line 20 and provides the summation result to the control algorithm 64.

For the example shown in FIG. 1, the control algorithm 64 provides a control output to the motor 46 to provide electric power assist for the vehicle. As mentioned above, examples of such controls are known to those skilled in the art. In other examples, the control algorithm 64 may control a chassis system such as a controllable brake system for controlling vehicle yaw rate, slip angle or some other vehicle function based on the steering wheel input. Example implementations of such control algorithms are also known to those skilled in the art and need not be set forth herein.

Figure 3:
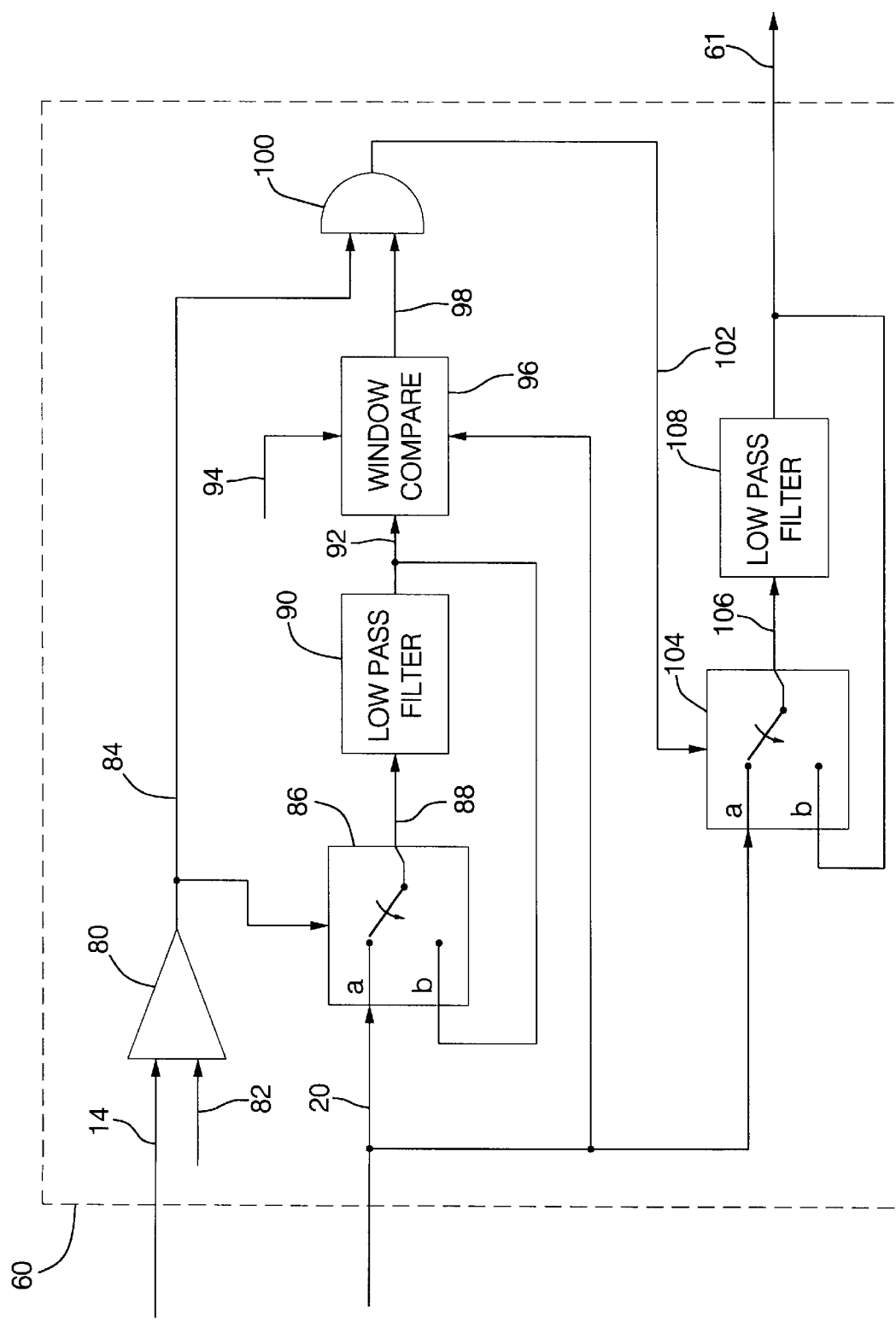
FIG. 3 illustrates schematically an example control according to this invention.

Referring now to FIG. 3, the example control according to this invention is illustrated in detail. The offset determination block 60 includes first and second low pass filters 90 and 108 and window comparitor 96.

As mentioned above, the position sensor 32 (FIG. 1) may be any suitable type of position sensor. It is preferred that the position sensor output have a linear correlation to steering wheel position. However, such a requirement is not necessary. In the event that the position sensor output does not linearly correlate to the steering wheel position, but rather has a non-linear correlation, then a function block is inserted into line 20 to operate a non-linear function on the steering wheel position sensor signal to convert the non-linear signal to a signal having linear correlation to steering wheel position. The function block may be implemented as a look-up table in controller memory that receives the steering wheel position sensor signal as the input and provides the linear correlating signal as the output. Such non-linear function look-up tables may be easily implemented by those skilled in the art.

The filters 90 and 108 are controlled by the switch blocks 86 and 104 that selectively couple the inputs of the filters 90 and 108 to the hand wheel position signal on line 20. Control of the first switch block 86 is responsive to vehicle speed as processed by comparator 80. When the vehicle speed signal on line 14 is above a predetermined threshold that is stored in memory and represented by line 82, comparator 80 provides a logic high output signal on line 84. The logic high signal on line 84 enables the "a" input of the switch block 86, coupling the hand wheel position signal on line 20 to line 88, which in turn is coupled to the input of the low pass filter 90. An example speed threshold represented by line 82 is 10 m.p.h. Thus, when the vehicle speed is above the threshold, low pass filter 90 provides at its output on line 92 a running filtered value of the hand wheel position signal on line 20.

When the vehicle speed falls below the threshold value represented by line 82, the signal on line 84 is logic low and the switch 86 couples its "b" input to the input of the filter 90 by way of line 88. The "b" input to switch 86 is coupled to filter output line 92. Thus when the vehicle speed is below the threshold represented by line 82, the output of low pass filter 90 is fed back to its input, causing the filter output to settle to a fixed value representative of the data within the filter when the "a" input was last disabled.

Window comparator 96, in general, has a center input, a data input and a comparison output. The filter output on line 92 is provided to the center input and sets, within the comparator, the value around which a comparison window is defined. For example, if the signal on line 92 is "A," then the window defined by window comparator 96 is the range A−B, to A+B, where B is a preset value represented by line 94 that determines the comparison window width. The data output line 98 of the window comparator 96 is logic high whenever the data input, the hand wheel position signal on line 20, carries a value within the window defined by the comparator 96 in response to the signals on lines 92 and 94. Thus, whenever the value "C" on line 20 is within the range of A−B to A+B, the output signal on line 98 is logic high, indicating a positive comparison output.

The output signal on line 98 is used with the output of comparator 80 to control the activation of the second low pass filter 108. The AND gate 100 receives the signals on lines 84 and 98 and, when both signals are high, provides a logic high signal to switch block 104. Switch block 104 responds to the logic high signal by enabling its "a" input to line 106, which, in turn, is coupled to the input of the low pass filter 108. Thus, when the signal on line 20 is within the window centered about the signal output of the first low pass filter 90 and when the vehicle speed is above the threshold value, the hand wheel position signal on line 20 is also coupled to the input of the second low pass filter 108 by way of block 104 and line 106.

When either the signal on line 20 is not within the window defined by comparator 96 or the vehicle speed is below the threshold speed on line 82, AND gate 100 outputs a logic low signal to the switch block 104. Switch block 104 responds to the logic low signal on line 102 by enabling the "b" input to line 106, which is coupled to the input of the second low pass filter 108. The "b" input is coupled to the output of the second low pass filter 108. As long as the "b" input is enabled, the second low pass filter 108 has its output fed back to its input, causing the output to settle to a value indicative of the data stored in the filter when switch block 104 last switched from the "b" input to the "a" input. The output of the filter 108 is the offset signal on line 61 which, as illustrated in FIG. 2, is used with the hand wheel position signal to provide a compensated position signal to the control algorithm 64.

Thus, according to this invention as described above, a first vehicle condition is determined by the comparator 80, establishing that the vehicle must be above the minimum speed threshold for the offset determination to take place. The comparison window defined by comparator 96 has, as its center, the output of low pass filter 90, which is only updated when the vehicle speed is above the threshold speed. While the comparator window is updated whenever the vehicle speed is above the threshold speed, the offset signal is only updated when the vehicle speed is above the threshold speed and when the hand wheel position signal is within a predetermined range of values defined by the window comparator 96, which values generally represent small steering wheel angles. Example time constants of the filters 90 and 108 are at least 15 minutes and, in one example successful implementation of the invention, both filters 90 and 108 had time constants of 17 minutes.

Those skilled in the art will readily understand that the control illustrated in FIG. 3 may be implemented in either hardware or software or in a hybrid system. If implemented in software, the switch functions may be done by "if/then" statements where, when a filter is made inactive, no rewriting of the filter output or memory location takes place. Rather, the filter outputs and memory locations are left alone until the filter is again made active in accordance with the control described in FIG. 3.

Figure 4:
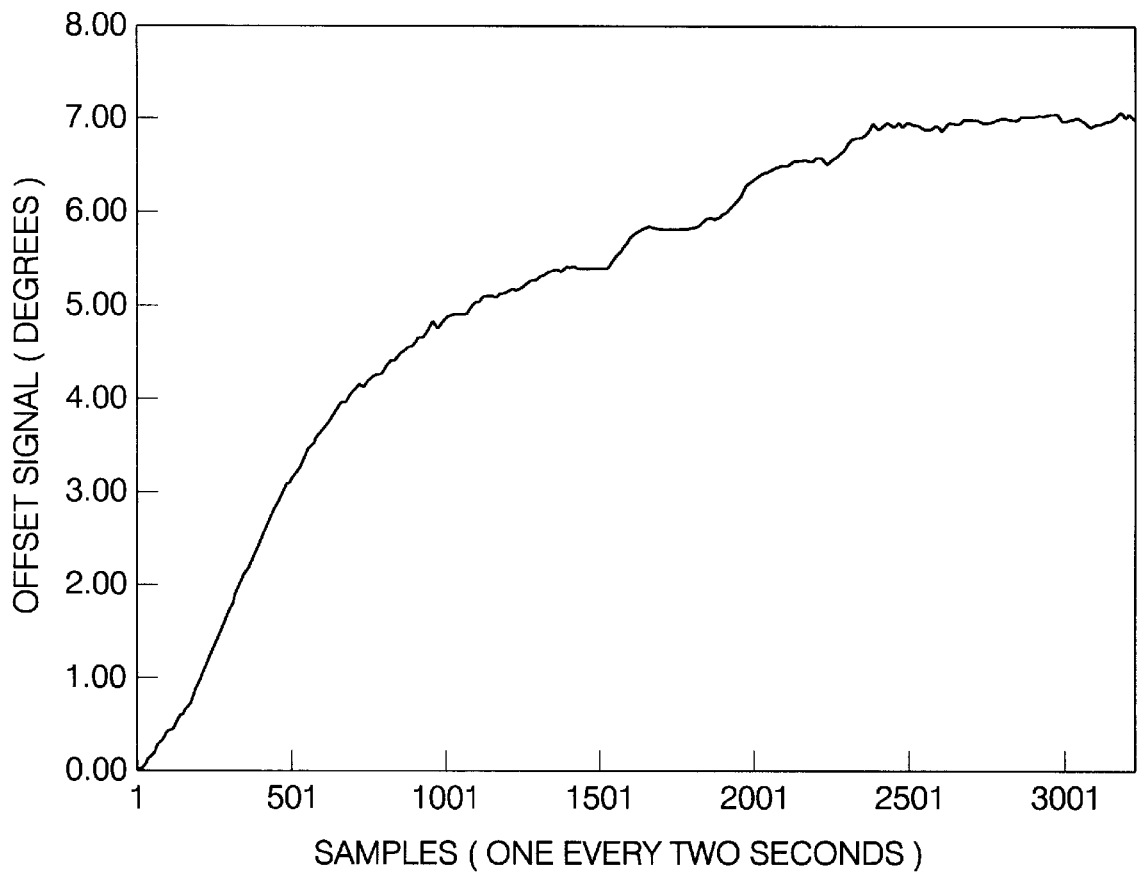
FIG. 4 illustrates an graph of an example operation of the invention.

Referring now to FIG. 4, an example operation of the system shown in FIG. 3 is illustrated as a plot of the offset (line 61, FIG. 3) determined for the example position sensor 32 (FIG. 1). In the example plotted, the offset was initialized to zero and over the course of a two hour highway drive, vehicle speed and steering angle were sampled every two seconds. Over the course of the drive, the offset approached and then effectively remained at a value of plus seven degrees, representing the system's determination of the inherent offset in the example position sensor 32.

We claim:

1. In a vehicle with a hand wheel, steerable wheels positionally responsive to the hand wheel and a steering position sensor coupled to the handwheel and providing a handwheel angle signal indicative of an angular position of the handwheel, a steering angle determination method comprising the steps of:

first filtering the handwheel angle signal to provide a first filter output;

defining a comparison window around the first filter output;

comparing the handwheel angle signal to the comparison window;

when the handwheel angle signal is within the comparison window, second filtering the handwheel angle signal to provide a second filter output;

when the handwheel angle signal is not within the comparison window, maintaining the second filter output fixed; and determining a steer angle signal as a difference between the handwheel angle signal and the second filter output, wherein offsets between the handwheel angle signal and steered positions of the steerable wheels are compensated for.

2. A steering angle determination method according to claim 1, wherein the first and second filtering are done only when measured vehicle speed is above a threshold value.

3. In a vehicle with a hand wheel, steerable wheels positionally responsive to the hand wheel and a steering position sensor coupled to the handwheel and providing a handwheel angle signal indicative of an angular position of the handwheel, a steering angle determination apparatus comprising:

a first filter having a first input and a first output, wherein the first input receives the handwheel angle signal from the steering position sensor and the first output provides a first filtered signal;

a window comparator having a center input, a data input and a comparison output, wherein the first filtered signal is coupled to the center input and the handwheel angle signal is coupled to the data input, wherein the window comparator defines a window around the first filtered signal at the center input and provides a positive comparison signal at the comparison output when the handwheel angle signal at the data input is within the window;

a second filter having a second input and a second output, wherein the second input receives the handwheel angle signal and the second output provides a second filtered signal that (a) is updated in response to the handwheel angle signal when the comparison output provides the positive comparison signal and (b) remains substantially fixed when the comparison output does not provide the positive comparison signal, wherein the second filtered signal represents an offset between the handwheel angle signal and a steered position of the steerable wheels.

4. A steering angle determination apparatus according to claim 3, wherein the first and second filters are active only when the vehicle speed is above a minimum threshold value.

5. A steering angle determination apparatus according to claim 3, wherein the first and second filters each have time constants of at least fifteen minutes.

* * * * *